United States Patent [19]

Tefft et al.

[11] 4,213,584
[45] Jul. 22, 1980

[54] HELICOPTER HOVER STABILITY AND CRUISE GUST EFFECT ALLEVIATION

[75] Inventors: Franklin A. Tefft, Killingworth; Ricardo L. Perez, Plantsville; Ronald E. Barnum, Trumbull, all of Conn.

[73] Assignee: United Technologies Corporation, Hartford, Conn.

[21] Appl. No.: 948,603

[22] Filed: Oct. 4, 1978

[51] Int. Cl.$^2$ .............................................. B64C 11/44
[52] U.S. Cl. .................................. 244/17.13; 244/177; 244/182
[58] Field of Search ...................... 244/17.13, 177, 179, 244/181, 182, 196, 197; 364/434

[56] References Cited

U.S. PATENT DOCUMENTS

| | | | |
|---|---|---|---|
| 2,650,046 | 8/1953 | Vanderlip | 244/177 |
| 3,920,966 | 11/1975 | Knemeyer | 244/182 |

Primary Examiner—Barry L. Kelmachter
Assistant Examiner—Reinhard J. Eisenzopf
Attorney, Agent, or Firm—M. P. Williams

[57] ABSTRACT

The pitch and roll channels of the stability augmentation system (inner loop) of a helicopter automatic flight control system are utilized to provide positional and attitude stability at low speeds and hover, and to reduce the attitude effects of wind gusts during essentially level, forward flight at cruise speeds. In the longitudinal or pitch channel, true longitudinal acceleration is summed with washed-out vertical gyro pitch in level flight below 60 knots, and washed-out vertical gyro pitch is used alone above 60 knots; in the lateral or roll channel, true lateral acceleration is summed with vertical gyro roll at speeds below 60 knots in essentially level flight, and vertical gyro roll is inputted alone above 60 knots whenever the heading hold logic has not been disengaged (indicating a roll has not been commanded to perfect a turn); thereby to provide positional and attitude stability at low speeds, and to provide attitude stability at cruise speeds.

3 Claims, 1 Drawing Figure

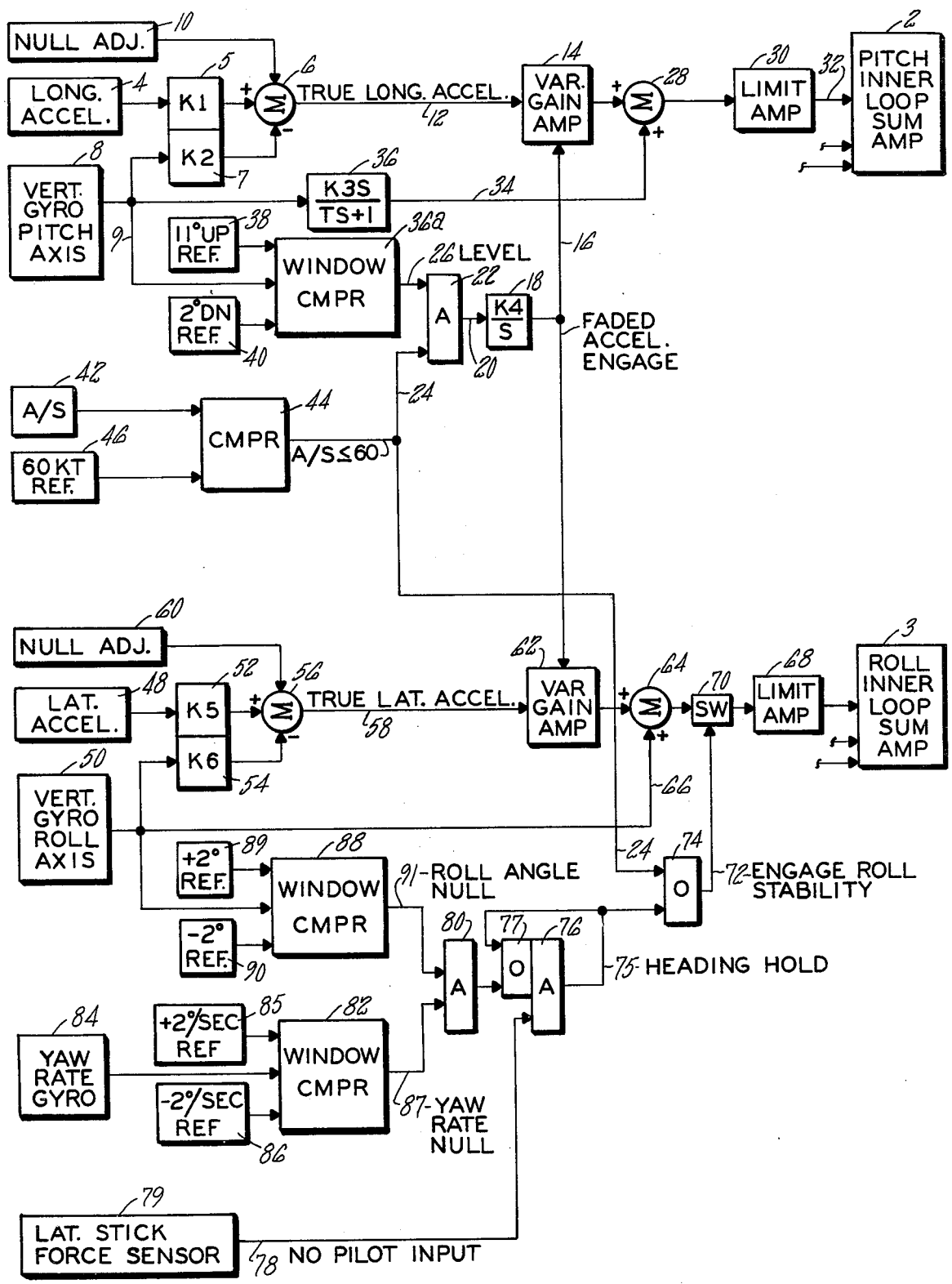

HELICOPTER HOVER STABILITY AND CRUISE GUST EFFECT ALLEVIATION

The invention disclosed herein was made under or in the course of a contract with the Department of the Navy.

BACKGROUND OF THE INVENTION

1. Field of the Invention

This invention relates to helicopter stability systems, and more particularly for improvements in inner loop stability systems which provide positional and attitude stability at low speeds, including hover, and provide attitude stability at cruise speeds.

2. Description of the Prior Art

As is known in the art, helicopter controls have become quite complex and are divided into essentially three general classes. One class of helicopter control provides force feel into the control sticks and pedals so that the pilot is given an indication of the commands being made to the aircraft, even though the normal control surface resistance is isolated from him by servo mechanisms and the like. The second type of control is typically referred to in helicopters as the "outer loop" or "trim" system. These are controls that actually move the control stick and pedals in lieu of the pilot, and are typically related to autopilot functions such as attitude, altitude, heading and airspeed hold. The third type of controls is typically referred to in helicopters as the "inner loop" system, and relates generally to stability augmentation. This system responds to short-term motion of the helicopter, sensed by rate gyros, to induce control signals to counteract such short-term motion, thereby to stabilize the aircraft in all of its coordinates. The outer loop controls are typically rate limited so that they cannot possibly cause more than a certain percentage of pilot authority per unit of time, but do have the capability of exercising the same full authority that the pilot may exercise. The inner loop controls, on the other hand, are typically not rate limited, since the purpose of these controls is to offset rapid, short-term changes in aircraft attitude or other flight parameters; but their total authority is typically limited to on the order of ±10% of the pilot's full authority. In other words, the inner loop can react instantaneously but can only augment the pilot or outer loop controls, whereas the outer loop must react more slowly, but can provide full command over the flight of the aircraft, when engaged.

In utilizing the outer loop, the pilot typically selects various trim positions for the different controls, such as a particular airspeed, a particular heading, a particular setting of the lateral and longitudinal positions of cyclic stick and the like and then engages the trim system which holds the aircraft's speed, attitude and heading in the positions set by the pilot.

In hover, altitude and attitude can be held by the outer loop (trim) system but position cannot be held, so that helicopters which are useful predominantly for earth-related functions (such as heavy lift helicopters used in the construction industry, transferring military equipment and the like) require a very heavy pilot work load in order to maintain position during earth-related operations, such as pick up or discharge of loads. Although the stability augmentation, inner loop system can eliminate some of the short-term variations in attitude and the like, these will not restore the aircraft to desired position nor tend to provide an adequate offset to changes in position which may be incurred as a consequence of inadvertent stick motion and/or wind gusts and the like. Naturally, any aircraft motion which tends to correct aircraft attitude will also cause a change in aircraft position with respect to earth. Thus stability augmentation and trim (autopilot, outer loop) functions are only partially assistive to the pilot during hover. Similarly, maintaining desired flight profile at low speeds presents problems similar to those described with respect to hover, hereinbefore. In essentially straight and level flight at cruise speeds (such as above 60 knots), a different but related demand on the pilot can result from gusty wind conditions which, although compensated for particularly in attitude by the stability augmentation system (inner loop), are not correctively compensated for in position by the inner loop or the outer loop in existing systems. This therefore causes a high degree of pilot work load during gusty wind conditions when the flight profile is of importance to the pilot.

SUMMARY OF THE INVENTION

Objects of the present invention include reduction of pilot work load during hover and during flight at cruise speeds; increased dampening of aircraft flight parameters with respect to wind gusts; and improved aircraft stability during hover and in gusty wind conditions.

According to the present invention, longitudinal and lateral acceleration are provided as inputs to the inner loop stability control system of a helicopter. According further to the invention, the acceleration inputs are limited to level flight at low speeds, or hover. In still further accord with the present invention, pitch and roll vertical gyro inputs are provided to the inner loop stability augmentation system of a helicopter to alleviate response of the helicopter to wind gusts while in flight at cruise speeds, other than in turns.

The present invention provides a significant reduction in pilot work load required for relatively stable hover or flight at low speeds, as well as in combating aircraft response to wind gusts when flying at cruise speeds. The invention is readily adaptable to the control systems available in sophisticated helicopters.

The foregoing and other objects, features and advantages of the present invention will become more apparent in the light of the following detailed description of an exemplary embodiment thereof, as illustrated in the accompanying drawing.

BRIEF DESCRIPTION OF THE DRAWING

The sole FIGURE herein is a simplified schematic block diagram of a helicopter control system in accordance with the present invention.

DETAILED DESCRIPTION

Referring now to the drawing, the conventional pitch under loop amplifier 2 and roll inner loop amplifier 3 are each provided inputs by a control system in accordance with the invention, for summation with traditional inputs (such as from rate gyros). Both the pitch channel (top of the FIGURE) and the roll channel (bottom of the FIGURE) combine acceleration and attitude, but there are differences therebetween.

In the pitch channel, the output of a longitudinal accelerometer 4 is fed through an amplifier 5 to a summing junction 6, which also responds to an amplifier 7 that is connected to the vertical gyro pitch axis 8 by a line 9. A suitable null adjustment (a variable DC voltage or the like) 10 is also provided to the summing junction 6 so as to correct the null offset of the accelerometer 4, in a well-known manner. The gain k1, k2 of the amplifiers 5, 7 are adjusted, as is known, so that the output of the summing junction 6 on a line 12 is a signal indicative of true longitudinal acceleration (with no gravity component). That is, the signal on the line 12 is indicative of acceleration of the aircraft in a horizontal plane (with respect to the earth) along the heading of the aircraft. This signal is applied to a variable gain amplifier 14, the gain of which is controlled by a signal on a line 16. The signal on the line 16 is faded up and faded down, for instance, by a suitable integrating and limiting circuit 18, in response to a signal on a line 20 which is provided, in the exemplary embodiment herein, by an AND circuit 22. The AND circuit 22 responds to a signal on a line 24 indicative of the fact that the airspeed is below cruise speed (such as 60 knots) and is responsive to a signal on a line 26 indicative of a low aircraft pitch attitude. The signal on a line 26 is indicative of a low aircraft pitch attitude. The signal on a line 26 is indicative of the fact that the pilot is not inducing an awkward maneuver; when, on the other hand, the pilot is trying to position the aircraft over a load or a pad, the likelihood is that he will be inducing pitch angles which will cause the signal on the line 26 to disappear. Similarly, the acceleration input to the pitch inner loop channel is not utilized at cruise speeds (such as above 60 knots), as indicated by the absence of the signal on the line 24. However when the aircraft is at low pitch angles and below 60 knots, the AND circuit 22 will provide the signal on a line 20; when this signal first appears, it is faded up slowly by the integrating circuit 18 up to some maximum amplitude (determined by the circuit) so as to slowly raise the gain of the amplifier 14 by means of the signal on the line 16. And similarly, if the AND circuit 22 has been operating, and becomes blocked, due to an increase in speed or excessive pitch attitude, the absence of the signal on the line 20 will cause the integrator 18 to slowly reduce the gain signal on the line 16 and therefore the gain of the amplifier 14. This provides fade in and fade out of the effect of the true longitudinal acceleration signal on the line 12.

The output of the variable gain amplifier 14 is provided to another summing junction 28, the output of which is applied through a limit amplifier 30 so as to limit the output signal 32 thereof as applied to the pitch inner loop channel, to some amount of authority which is determined to be proper in a particular system in which the present invention is utilized. For instance, in a system in which inner loop authority is limited to ±10% of pilot authority, the limit amplifier 30 may limit the signal on the line 32 to commands equal to ±5% of pilot authority, or otherwise as may be found desirable.

The summing junction 28 also receives a signal on a line 34 from a washout circuit 36 which is a well-known lagged rate circuit, such as a capacitor feeding a high gain amplifier which has both capacitive and resistive feedback paths from its output to its input. This causes the signal on the line 34 to follow an input signal on a line 9 in the short term, and then decay the signal to zero over a longer term. The purpose of this is so that as pitch changes, the circuit 36 will provide an input through the summing junction 28 which tends to compensate for the pitch, but if a new general pitch reference or trim point is established, then the circuit 36 eventually provides zero output on a line 34 and does not tend to buck the new trim or reference pitch position which may be established.

The signal on the line 9 is also applied to a window comparator 36a which is fed by a voltage from a reference 38 indicative of 11° of positive pitch and another voltage from a reference 40 indicative of 2° of downward pitch. The comparator 36 provides the signal on a line 26 only if the pitch angle indicated by the pitch axis of the vertical gyro 8 is between 11° up and 2° down.

The airspeed less than 60 knots signal on the line 24 is generated in a usual fashion by comparing the output of an airspeed sensor 42 (which may be a transducer responsive to the pitot-static system, as is known in the art) in a comparator 44 with an output voltage indicative of 60 knots from a reference 46.

The roll channel responds to a lateral accelerometer 48 and the roll axis of the vertical gyro 50, suitably gain adjusted through amplifiers 52, 54, so as to provide, at the output of a summing junction 56, a signal on a line 58 indicative of the true lateral acceleration (that is acceleration in a horizontal plane with respect to earth axis, which is lateral with respect to the heading of the aircraft). The summing junction 56 is provided with a null adjustment 60 input to compensate for null offset in the lateral accelerometer 48. The true lateral acceleration signal on the line 58 is applied to a variable gain amplifier 62 for fade in and fade out in response to the signal on the line 16, as described with respect to the amplifier 14, hereinbefore. The output of the variable gain amplifier 62 is applied to a summing junction 64 which also responds to the vertical gyro roll axis signal on a line 66. The output of the summing junction 64 is connected to a limit amplifier 68 through a switch 70, which may be a suitable electronic switch or a relay, which is in turn controlled by a signal on a line 72. The signal on the line 72 is present when the airspeed is below 60 knots, or regardless of airspeed so long as indications of a turn are not present, as is described more fully hereinafter. This provides for roll stability except during turns at high speeds.

The engage roll stability signal on the line 72 is generated by an OR circuit 74 in response to the airspeed less than 60 knots signal on the line 24, or in response to a heading hold signal on a line 75 from an AND circuit 76. The AND circuit 76 is co-responsive to the output of an OR circuit 77 (described hereinafter) and to a signal on a line 78 indicative of the fact that the pilot is not putting a significant input into lateral cyclic pitch stick position, as indicated by a lateral stick force sensor 79. This sensor may be of the general stick force sensing configuration described with respect to FIG. 2 of commonly owned U.S. Pat. No. 4,003,532 to Adams and Johnson. On the other hand, some other form of indication of pilot induced stick position may be utilized as desired in any implementation of the present invention.

The OR circuit 77 responds to the heading hold signal on the line 75 to latch up the AND circuit 76, once it has operated, for so long as the no pilot input signal remains on the line 78. The initial operation of the AND circuit 76 depends on the OR circuit 77 receiving a signal from an AND circuit 80. The AND circuit 80 responds to the output of a window comparator 82 which compares the output of a yaw rate gyro 84 with reference voltages indicative of yaw rates of ±2° per second provided by sources 85, 86, to provide a yaw rate null signal on a line 87. The output of the comparator 82 therefore indicates that sufficient yaw to coordinate a turn above 60 knots is not being commanded, which is further indication that the aircraft is not undergoing a turn at cruise speeds. The AND circuit 80 is further responsive to a window comparator 88 which compares the roll axis vertical gyro output on the line 66 with ±2° of roll as indicated by sources 89, 90, to provide a roll angle null signal on a line 91. The output of the window comparator 87 is indicative of the fact that the aircraft roll is less than what normally would occur for a turn at speeds in excess of 60 knots. The AND circuit 76 is first operated by the concurrence of no pilot output with yaw rate and roll angle nulls. But it is latched up then to allow roll angle stability even if the yaw rate or roll angle exceed the null windows, so long as such excess is not pilot induced. Any pilot induced lateral command will remove the signal on line 78 so the AND circuit will turn off; and it will stay off even after the pilot retrims the lateral stick, once in the turn. The heading hold will reengage only after the turn is complete and the stick is trimmed.

The roll stability input of the invention is permitted to be used below 60 knots (in the example herein) without regard to turns, because turns at these lower speeds are not coordinated, and therefore do not involve commanded roll inputs which the roll stability would tend to buck out. The roll angle stability provided by the signal on the line 66 is not washed out (as is the pitch angle stability on the line 34), since roll will generally be trimmed-out at level, whereas pitch is trimmed-out at some desired angle related to speed, and is not normally level. On the other hand, the roll input is disengaged by the switch 70 during turns at high speed so as not to interfere with the roll command necessary for a coordinated turn; in contrast, the pitch angle input is not prevented at any speed, since the washout circuit will simply dampen any pitch inputs (whether commanded by the outer loop trim or autopilot system, or by the pilot; or whether commanded by the pitch rate gyro input to the inner loop amp 2). Thus, the washout circuit 36 will prevent any long-term tendency to buck these commands, therefore merely providing additional damping of pitch angle through the inner loop system on a relatively short-term basis.

In operation, any forward acceleration will create a command for cyclic pitch which would drive the nose of the helicopter upward; similarly, any sensing of nose down pitch angle will cause a command to drive the nose of the helicopter upward, to the extent not washed out. Similarly, with respect to roll: any acceleration to the left would cause a roll to the right and any roll to the left would cause a roll to the right.

In any given embodiment, it may be that only the positional stability in hover is desired; in that case, the summing junctions 28 and 64 may be eliminated along with the washout circuit 36 and the lines 34 and 66. On the other hand, if only attitude stability is desired, then the longitudinal accelerometer, lateral accelerometer and their associated functions, including the variable gain amplifiers 14, 62 and the controls therefore, may be eliminated. However, the reduction of pilot work load during hover is best achieved by including both positional and attitude stability as illustrated in the FIGURE. And, once attitude stability of the type described is provided for in hover, it is readily maintained for gust alleviation at cruise speeds, in the manner described.

The present invention has been implemented in a hardwired, essentially analog form, of which the FIGURE herein is a simplified representation. Following such implementation, the invention has also been implemented in an essentially digital, software-controlled fashion, in a twin digital control system of the type described in a general way in commonly owned copending application of Murphy and Clelford, Ser. No. 938,583, filed Aug. 31, 1978, and entitled FAIL-OPERATIONAL, FAIL-SAFE MULTI-COMPUTER CONTROL SYSTEM. Thus the invention may be implemented in either mode, in dependence on the type of control system (analog or digital) in use in the aircraft in which the present invention is to be employed.

Thus, although the invention has been shown and described with respect to an exemplary embodiment thereof, it should be understood by those skilled in the art that the foregoing and various other changes, omissions and additions may be made therein and thereto, without departing from the spirit and scope of the invention.

Having thus described a typical embodiment of our invention, that which we claim as new and desire to secure by Letters Patent is:

1. A helicopter flight control system having a longitudinal cyclic pitch inner loop summing amplifier for summing short-term pitch stability inputs and a lateral cyclic pitch inner loop summing amplifier for summing short-term roll stability inputs, said amplifiers providing corresponding commands to the helicopter control surfaces thereby to stabilize the helicopter in flight, in which the improvement to provide additional positional stability comprises:

a vertical gyro having a pitch axis output and a roll axis output;

a longitudinal accelerometer;

a lateral accelerometer;

means responsive to said longitudinal accelerometer and to the pitch axis output of said vertical gyro for providing a true longitudinal acceleration signal indicative of the horizontal acceleration of the helicopter along its longitudinal axis;

means responsive to said lateral accelerometer and to the roll axis output of said vertical gyro for providing a true lateral acceleration signal indicative of the horizontal acceleration of the helicopter along its lateral axis;

means including an airspeed sensor for providing a signal indicative of the airspeed of the helicopter being below a cruise speed;

means responsive to the pitch axis of said vertical gyro for providing a signal indicative of low helicopter pitch angle;

means concurrently responsive to said below cruise speed signal and said low pitch angle signal for generating a faded acceleration engage signal;

pitch means responsive to said faded acceleration engage signal and to said true longitudinal acceleration signal for providing a signal input to said longitudinal cyclic pitch inner loop summing amplifier to cause the commanded longitudinal cyclic pitch of the helicopter to be in a direction to countermand the true longitudinal acceleration sensed; and roll means responsive to said faded acceleration engage signal and to said true lateral acceleration signal for providing a signal input to said lateral cyclic pitch inner loop summing amplifier to cause the commanded lateral cyclic pitch of the helicopter to countermand the true lateral acceleration sensed.

2. A helicopter flight control system according to claim 1 in which said roll means includes a roll summing junction and a switch for selectively, when engaged, connecting said roll summing junction to said lateral cyclic pitch inner loop summing amplifier; and further comprising:
- means for generating a heading hold signal in response to lack of a pilot command in lateral cyclic stick concurrently with and following low roll angle and low yaw rate; and
- means responsive to said below cruise speed signal or, alternatively, to said heading hold signal to engage said switch.

3. A helicopter flight control system having a longitudinal cyclic pitch inner loop summing amplifier for summing short-term pitch stability inputs and a lateral cyclic pitch inner loop summing amplifier for summing short-term roll stability inputs, said amplifiers providing corresponding commands to the helicopter control surfaces thereby to stabilize the helicopter in flight, in which the improvement to provide additional attitude stability comprises:
- a vertical gyro having a pitch axis output and a roll axis output;
- lag rate means responsive to the pitch axis output of said vertical gyro for providing a signal indicative of washed out pitch angle of the helicopter;
- pitch means for applying said washed out pitch angle signal to said longitudinal cyclic pitch inner loop summing amplifier to cause the commanded longitudinal cyclic pitch of the helicopter to be in a direction to countermand the pitch angle sensed to the extent not washed out by said lag rate means;
- roll means responsive to the roll axis output of said vertical gyro, and including a switch for selectively, when engaged, providing a roll angle signal to said lateral cyclic pitch inner loop summing amplifier to cause the commanded lateral cyclic pitch of the helicopter to be in a direction to countermand the roll angle sensed;
- means including an airspeed sensor for providing a signal indicative of the airspeed of the helicopter being below a cruise speed;
- means for generating a heading hold signal in response to lack of a pilot command in lateral cyclic stick concurrently with and following low roll angle and low yaw rate; and
- means responsive to said below cruise speed signal or, alternatively, to said heading hold signal to engage said switch.

* * * * *